March 5, 1963
A. LÖDIGE
3,079,690
DENTAL TREATMENT APPARATUS
Filed July 13, 1959
3 Sheets-Sheet 1
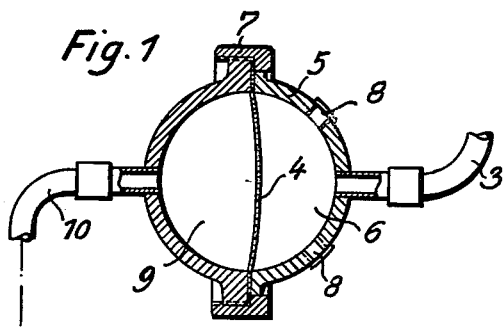
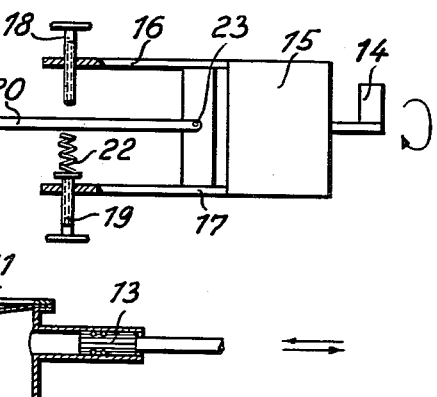
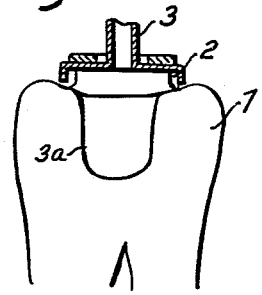
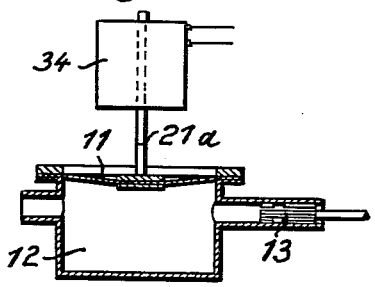
INVENTOR.
Alois Lödige
BY
Bair, Freeman & Molinare
Attys.

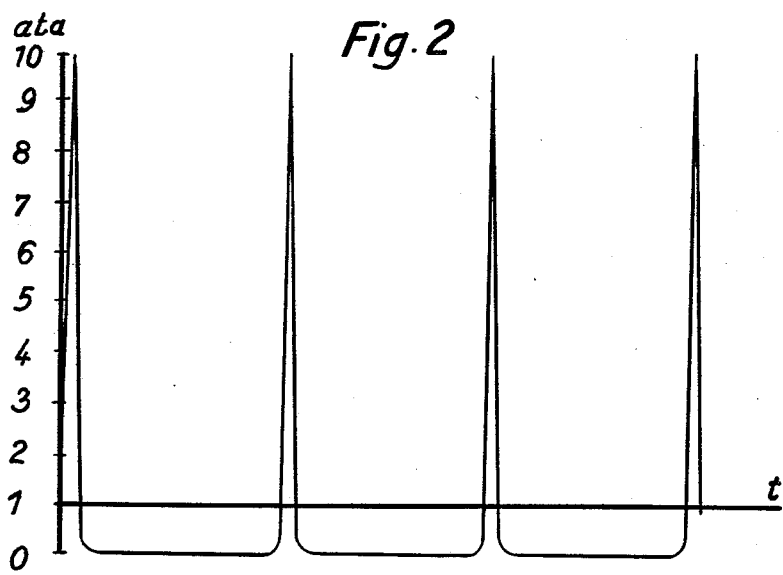
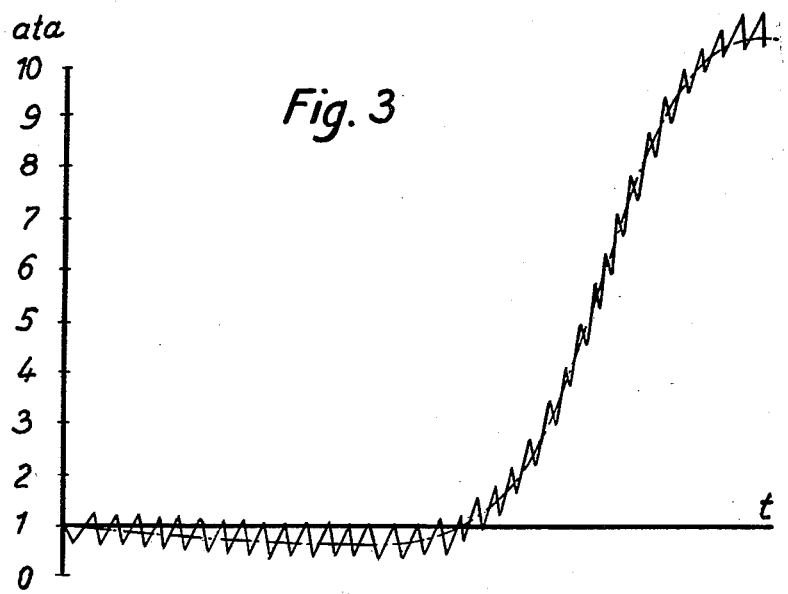

March 5, 1963
A. LÖDIGE
3,079,690
DENTAL TREATMENT APPARATUS
Filed July 13, 1959
3 Sheets-Sheet 3
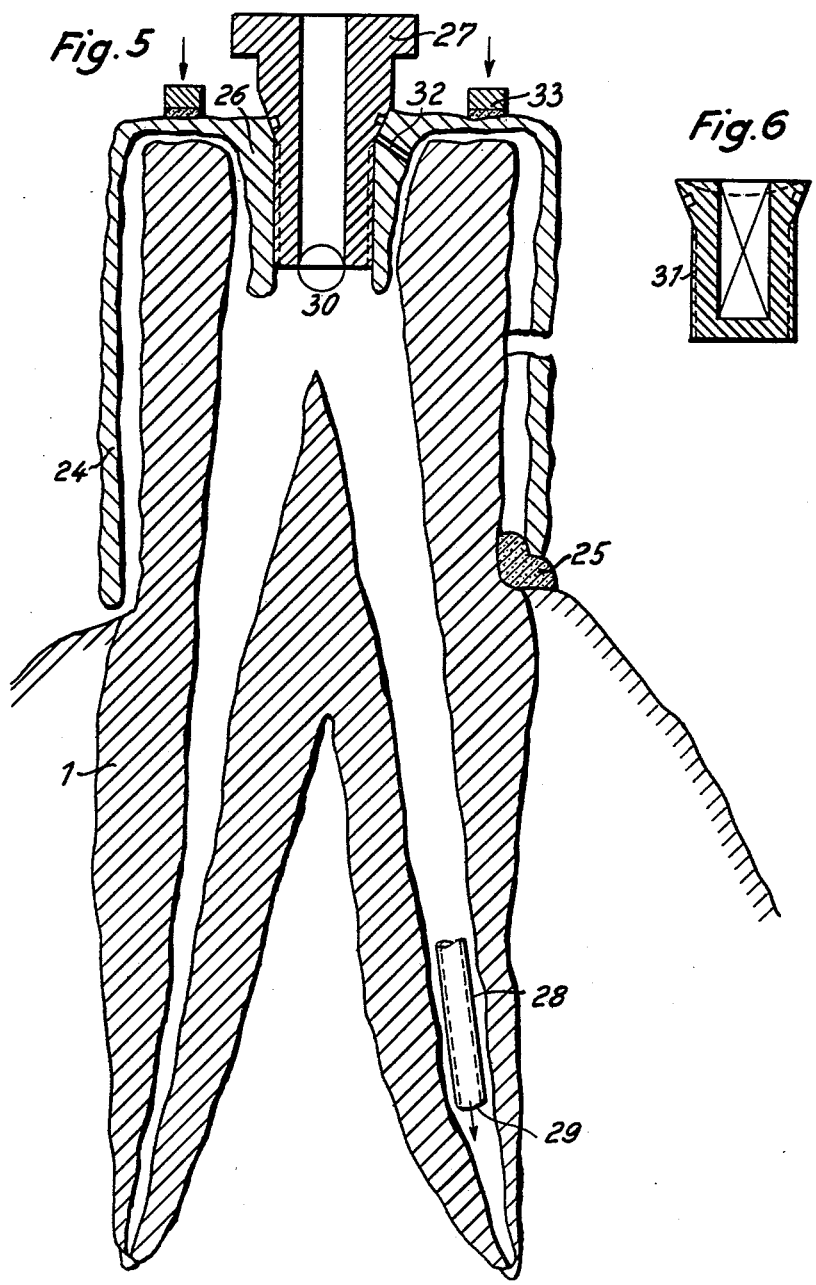
INVENTOR.
Alois Lödige
BY
Bair, Freeman & Molinare
Att'ys Patented Mar. 5, 1963

3,079,690
DENTAL TREATMENT APPARATUS
Alois Lödige, 13 Frankfurter Weg, Paderborn,
Westphalia, Germany
Filed July 13, 1959, Ser. No. 826,780
15 Claims. (Cl. 32—40)

This invention relates to improvements in dental treatment apparatus.

It is an object of the present invention to provide an improved dental treatment apparatus whereby deleterious bacteria may be drawn out from the finest ramifications of the bony tissue of the tooth to be treated in a relatively short period of time.

It is a further object of the present invention to provide an improved dental treatment apparatus which shall be capable of being used, with advantage, for filling and crowning a tooth in addition to removing the bacteria therefrom.

According to the present invention dental treatment apparatus comprises a container, means for placing the interior of the container in communication with the tooth to be treated and means for applying an oscillatory pressure to the interior of the container.

Preferably the oscillatory pressure applying means comprises a diaphragm and means for vibrating the diaphragm.

One embodiment of the present invention will now be described by way of example, reference being made to the accompanying drawings in which:

FIG. 1 illustrates diagrammatically one form of apparatus according to the invention, FIG. 1a illustrates a modification, FIGS. 2 and 3 show oscillatory pressure curves, FIG. 4 illustrates a part of the apparatus applied to a tooth for treatment, FIG. 5 shows, on a larger scale, a part of the apparatus applied to a tooth for treatment, and FIG. 6 shows a closure plug for use with the apparatus shown in FIG. 5.

The dental apparatus of this example comprises a rigid container 5 sub-divided into two chambers 6 and 9 by a flexible wall, preferably a diaphragm 4 (FIG. 1). The container 5 is in two halves connected by bayonet type closure means 7 or any other suitable means. The interior of the chamber 6 communicates with a rubber tube 3 and may, if desired, communicate with other such tubes through threaded apertures shown closed by plugs 8. The chamber 9 communicates through a pressure resisting rubber tube 10 with a vessel 12 having a diaphragm 11 closing the vessel. A plunger 13 slidable in a sleeve communicating with the interior of the vessel 12 controls the mean pressure in the latter and is connected to manually operable means (not shown) whereby its position may be adjusted. A manometer (not shown) is provided to indicate the pressure prevailing in the vessel 12.

An out-of-balance electric motor 15 is provided with unbalancing means 14 and is mounted on a torsion bar 23 so that it oscillates freely. A transmission lever 20 is connected through a push rod 21 to the diaphragm 11. The motor 15 is provided with arms 16 and 17 carrying adjustable limiting abutment screws 18 and 19 arranged to co-operate with the lever 20 to control the vibration of the lever and limit the oscillation of the motor. The abutment screw 19 carries a damping spring 22.

In the operation of the apparatus described the vessel 12, tube 10 and chamber 9 are filled with a pressure transmitting liquid and the motor 15 is switched on.

The plunger 13 is adjusted to give a desired mean pressure in the pressure transmitting liquid and this pressure is increased when the abutment screw 18 strikes the lever 20 and decreased when the spring 22 strikes the lever 20 by the vibrations imparted to the diaphragm 11, thus superimposing a high-frequency oscillating pressure on the mean pressure which is imparted as vibrations to the diaphragm 4. The abutment screw 18 provides pressure peaks of short duration and the spring 22 provides pressure troughs of longer duration, the relative amplitudes being adjustable by adjustment of the adjustment screws 18 and 19. The pressure waveform is shown in FIG. 2 and it will be appreciated that the mean pressure in the vessel 12 may be selected to be such that even on the pressure peaks the pressure may be maintained below atmospheric and that this sub-atmospheric pressure may be further reduced by screwing outwardly the abutment screw 19. The effect achieved by adjusting the position of the plunger 13 over a period of time to give firstly a sub-atmospheric mean pressure and then a super-atmospheric mean pressure is illustrated in FIG. 3.

It will be appreciated that the oscillatory pressure may be produced by vibrating the diaphragm 11 by any suitable means such as, for example, that illustrated in FIG. 1a. In the example illustrated in this figure the diaphragm 11 is connected directly through push rod 21a to an electro-magnetic vibration-generator 34. This generator 34, with advantage, comprises a combination of coils and capacitors the values of the latter being selected to provide the desired oscillation characteristic and produce the desired vibrations of the diaphragm 11 as described above.

Where the surface of a tooth is to be treated, as opposed to the interior and roots thereof, the tube 3 opens out into a cooperating plate or fitting 3a which is pressed through sealing means 2 (FIG. 4) against the tooth 1. The chamber 6 is filled with a suitable treating medium, e.g. a sterilizing liquid and the motor 15 is switched on whilst the plunger 13 is adjusted to give a mean pressure so that the pressure at no time reaches atmospheric. Thus a suction is in effect applied to the tooth having an oscillatory pressure superimposed thereon. This has the effect of drawing out from the tooth the inflammation-causing bacteria, the oscillatory pressure assisting in drawing the bacteria out from the finest ramifications of the tooth. The mean pressure is then gradually increased to ensure a super-atmospheric pressure at least on the pressure peaks and the short sharp peaks have the effect of forcing the sterilizing liquid into the tooth ramifications. After washing and drying the tooth it is ready for filling and the same apparatus may be used for this purpose. In this case the terminal portion of the tube 3 is clamped over the drilled part of the tooth through a packing ring and the filling material is pressed into position from the diaphragm 4 so that the filling has a slight amount of pre-tensioning. This has the advantage that as the filling material cools and contracts it nevertheless remains firmly in position in the tooth. When the filling material has cooled it may be ground off in the usual way.

Where the root of a tooth is to be treated the tooth is provided with a crown 24 (FIG. 5) which is sealed at its lower end by sealing means 25 which may be omitted if the lower end of the crown is pushed below the level of the gum. The upper part of the crown 24 is formed with a threaded socket 26 in which a rubber tube-like connecting piece 27 is engaged. The passage through the connecting piece 27 connects with a tubule 28 inserted deeply into the root to be treated and having an aperture 29 through which the treatment medium enters the root tip. The connecting piece 27 may be provided in certain cases with a non-return valve 30 if the pressure within the tooth is to be maintained constant for a period of time.

In order to permit the interior of the tooth to be sealed off in a sterile manner whilst the tubule 28 is removed and treatment is interrupted, a closure plug 31 is provided to replace the connecting piece 27.

The treatment is commenced with a high-frequency oscillatory sub-atmospheric pressure which draws out the contaminated tissue liquid and ensures that it does not penetrate further with its inflammation causing bacteria. The mean pressure characteristic is caused to follow that shown in FIG. 3 so that an effective quantity of bacteria-destroying material is introduced deeply to the tissue. In order that no error shall be made, by faulty actuation, in the sequence from mean sub-atmospheric to super-atmospheric pressure, it is possible for the entire installation to be controlled automatically by any known means.

After a period of this treatment, a mixture of dead germs and other cells collects in the tooth and the tooth must from time to time be blown and washed out with a jet pipe and dried. The tubule 28 can serve as a jet pipe for the root-tip treatment.

For the final blowing and washing out and drying, use is made of the same apparatus, the chamber 6 communicating through the crown 24. The washing out is effected by injecting the liquid from the chamber 6, with an intensive jet effect, into the interior of the tooth, the connecting piece 27 being unscrewed to the extent required to raise its sealing surface from the crown and permit the liquid to escape freely through a channel 32 provided in the socket 26.

Blowing out is effected in a similar manner, one of the alternative connections shown closed by a plug 8 (FIG. 1) being used as an inlet for dried compressed air.

If drying-out can only be achieved slowly, as in the case of especially fine root channels, the volume of the chamber 6 is reduced substantially to zero, the channel 32 is closed by screwing home the connecting piece 27 and a sub-atmospheric pressure is produced in the whole unit so that the liquid in the tooth is evaporated.

If a crown is to be fitted to the tooth, then the apparatus of the invention is also of use. The crown is placed in position and the connecting piece 27 connected to the end of the tube 3 is screwed into the socket 26. Preferably a rubber ring, which can be subsequently removed, is inserted under the crown so that the latter may be sealed in a pressure-tight manner. The crown is pressed against the jaw or head by clamping jaws and the entire tooth is subjected to the treatment material which has the oscillatory pressure imparted thereto superimposed upon a mean pressure which initially is sub-atmospheric. The treatment proceeds as described above, the interior of the crown and the tooth being washed and blown out and dried. The filling of the crown then takes place. The filling material is pressed into the crown under a relatively high pressure, the crown stretching resiliently as this is done. The entire system is now under tension until the filling material has solidified at which time the crown and the tooth are pre-tensioned at a specific pressure. This pre-tensioning compensates for shrinkage of the filling material so that the crown is positioned, without any gap, firmly on the tooth stump, thus preventing access to the tooth stump of bacteria. The crown is closed by screwing in the closure plug 31.

If it becomes necessary subsequently to treat a tooth so crowned or a molar tooth, this can be done at any time by removing the plug 31 and again treating the tooth with the apparatus of this invention. The interior of the crown is exposed to a germ-destroying material under pressure from the tube 3, cracks being formed in the filling material if the pressure is higher than that previously used. A hole is also desirably drilled in the generatrix of the molar channel filling. The pressure is further increased so that the germ-destroying material penetrates right to the root tips so that the entire tooth is sterilized. The tooth is then sealed-off by a semi-liquid cementing medium which penetrates deeply into the cracks under the influence of the oscillatory pressure.

What I claim is:

1. Dental treatment apparatus comprising a rigid container including one flexible wall consisting of a diaphragm, a fitting adapted to engage the surface of the tooth being treated, conduit means establishing communication between the interior of said container and said fitting, a fluid confined within said container, and means including an out-of-balance electric motor mounted on a torsion bar for oscillating said flexible wall to transmit the oscillations through said fluid to said fitting.

2. Dental treatment apparatus comprising a rigid container including one flexible wall, a fitting adapted to engage the surface of the tooth being treated, conduit means establishing communication between the interior of said container and said fitting, a fluid confined within said container, means connected with said container for superimposing stationary pressure on said fluid, and means for oscillating said flexible wall to transmit the oscillations through said fluid to said fitting.

3. Dental treatment apparatus according to claim 1 including a lever connected between said diaphragm and said motor and two oscillation limiting abutments carried on the motor for co-operation with said lever to control the vibration of said lever.

4. Dental treatment apparatus according to claim 3 wherein at least one abutment is adjustable.

5. Dental treatment apparatus according to claim 4 including a damping spring mounted on one abutment for engagement with said lever at one limit of oscillation of said motor.

6. Dental treatment apparatus comprising a container, a first diaphragm disposed within said container and subdividing the latter into two chambers, a fitting adapted to engage a tooth to be treated, conduit means between the interior of one chamber and said fitting, tooth-treating liquid disposed in said one chamber, tube, and fitting, a pressure-transmitting fluid in the other chamber, and means for imparting an oscillatory pressure to said fluid for transmission to said tooth-treating liquid through said first diaphragm.

7. Dental treatment apparatus according to claim 6 wherein the oscillatory pressure imparting means comprises a second diaphragm exposed to said fluid and electro-magnetic means operatively connected to said second diaphragm to impart vibrations thereto.

8. Dental treatment apparatus comprising a container, a first diaphragm disposed within said container and subdividing the latter into two chambers, a first tube opening into one of said chambers for placing the interior of said one chamber in communication with the tooth to be treated, a vessel, a second diaphragm closing said vessel, a second tube connecting the interior of the other of the said chambers with the interior of said vessel and means operatively connected to said second diaphragm to vibrate the latter.

9. Dental treatment apparatus according to claim 8 including a sleeve opening into said vessel and a plunger slidable in said sleeve to adjust the mean pressure prevailing in said vessel.

10. Dental treatment apparatus according to claim 8 including a fitting into which opens the end of said first tube remote from said one chamber and sealing means for co-operation with said fitting and the tooth to be treated.

11. Dental treatment apparatus according to claim 8 including a tooth crown having a threaded socket and a connecting piece threadedly engaged in said socket and connected to the end of said first tube remote from said one chamber.

12. Dental treatment apparatus according to claim 11 including a tubule for insertion into the tooth root and connected to said connecting piece.

13. Dental treatment apparatus comprising a container, a first diaphragm disposed within said container and subdividing the latter into two chambers, a first tube opening at one end into one of said chambers, tooth-engaging means connected to the other end of said first tube, a tooth-treating fluid disposed in said first tube, said one chamber and said tooth-engaging means, a vessel, a second diaphragm closing said vessel, a second tube connecting the interior of said vessel with the interior of the other of said chambers, a force-transmitting fluid disposed in said second tube, said vessel and said other chamber, a sleeve opening into said vessel, a plunger slidable in said sleeve to adjust the mean pressure prevailing in said vessel, a push-rod connected to said second diaphragm and electromagnetic means for imparting vibrations to said second diaphragm through said push-rod and transmitting said vibrations through said fluid to said first diaphragm.

14. Dental treatment apparatus comprising a container, a first diaphragm disposed within said container and subdividing the latter into a first and a second chamber, a first tube connecting to said first chamber at one end and terminating at the other end in a tooth engaging fitting, liquid within said first chamber and first tube, a vessel, a second diaphragm closing the vessel, a second tube connecting the interior of said vessel with the interior of said second chamber, liquid in said second chamber, said vessel and said second tube, and means for imparting vibrations to said second diaphragm, thereby transmitting force to said first diaphragm through the liquid therebetween.

15. The apparatus of claim 14 in which the liquid in said first tube and first chamber is medicinal in nature.

References Cited in the file of this patent

UNITED STATES PATENTS

| | | |
|---|---|---|
| 1,818,287 | Wahl | Aug. 11, 1931 |
| 1,898,652 | Williams | Feb. 21, 1933 |
| 1,958,936 | Bajette et al. | May 15, 1934 |
| 2,099,871 | Stern | Nov. 23, 1937 |